(12) United States Patent
Li et al.

(10) Patent No.: US 10,985,863 B2
(45) Date of Patent: Apr. 20, 2021

(54) METHOD AND APPARATUS FOR TRANSMITTING TRANSPORT BLOCK, AND METHOD AND APPARATUS FOR RECEIVING TRANSPORT BLOCK

(71) Applicant: ZTE CORPORATION, Guangdong (CN)

(72) Inventors: Jian Li, Shenzhen (CN); Yu Ngok Li, Shenzhen (CN); Jun Xu, Shenzhen (CN); Peng Hao, Shenzhen (CN); Nan Zhang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 124 days.

(21) Appl. No.: 16/324,241

(22) PCT Filed: Aug. 1, 2017

(86) PCT No.: PCT/CN2017/095401
§ 371 (c)(1),
(2) Date: Feb. 8, 2019

(87) PCT Pub. No.: WO2018/028467
PCT Pub. Date: Feb. 15, 2018

(65) Prior Publication Data
US 2020/0195370 A1    Jun. 18, 2020

(30) Foreign Application Priority Data

Aug. 12, 2016 (CN) .......................... 201610664728.3

(51) Int. Cl.
*H04L 1/00* (2006.01)
*H04W 76/27* (2018.01)
(Continued)

(52) U.S. Cl.
CPC .......... *H04L 1/0004* (2013.01); *H04L 27/362* (2013.01); *H04W 72/042* (2013.01); *H04W 72/0413* (2013.01); *H04W 76/27* (2018.02)

(58) Field of Classification Search
CPC ... H04L 1/0004; H04L 27/362; H04L 1/0009; H04L 1/0014; H04L 1/0003; H04L 1/00;
(Continued)

(56) References Cited

U.S. PATENT DOCUMENTS

| | | | |
|---|---|---|---|
| 6,611,554 B1 * | 8/2003 | Chouly | H04L 25/4927 375/222 |
| 2006/0165191 A1 * | 7/2006 | Lin | H04B 7/0417 375/267 |

(Continued)

FOREIGN PATENT DOCUMENTS

| | | |
|---|---|---|
| CN | 101022445 A | 8/2007 |
| CN | 101924998 A | 12/2010 |

(Continued)

OTHER PUBLICATIONS

International Search Report and Written Opinion for International Appl. No. PCT/CN2017/095401, dated Oct. 23, 2017.
(Continued)

*Primary Examiner* — Gregory B Sefcheck
*Assistant Examiner* — Joshua Smith
(74) *Attorney, Agent, or Firm* — Foley & Lardner LLP

(57) ABSTRACT

A method and apparatus for transmitting a transport block, and a method and apparatus for receiving a transport block are provided. The method includes: acquiring, by a transmitting node, a data signal obtained by performing a process of a physical layer procedure on the transport block, where the physical layer procedure at least includes channel coding and modulating, one transport block has multiple modulating and coding schemes, the multiple modulating and coding
(Continued)

schemes include multiple modulating schemes, or multiple coding schemes, or multiple modulating schemes and multiple coding schemes; and transmitting, by the transmitting node, the data signal and a control signal corresponding to the data signal to a receiving node.

13 Claims, 8 Drawing Sheets

(51) Int. Cl.
*H04L 27/36* (2006.01)
*H04W 72/04* (2009.01)

(58) Field of Classification Search
CPC .... H04L 27/0008; H04L 27/32; H04W 76/27; H04W 72/0413; H04W 72/042
See application file for complete search history.

(56) References Cited

U.S. PATENT DOCUMENTS

| | | | |
|---|---|---|---|
| 2010/0023830 A1* | 1/2010 | Wengerter | H04L 1/0025 714/748 |
| 2011/0075759 A1* | 3/2011 | Seok | H04W 72/042 375/295 |
| 2012/0076068 A1* | 3/2012 | Zhao | H04L 1/0003 370/312 |
| 2016/0330738 A1* | 11/2016 | Eitan | H04W 72/0446 |

FOREIGN PATENT DOCUMENTS

| | | |
|---|---|---|
| EP | 2 442 595 A1 | 4/2012 |
| EP | 3 214 784 A1 | 9/2017 |
| WO | WO-2010/079849 A1 | 7/2010 |
| WO | WO-2016/065922 A1 | 5/2016 |

OTHER PUBLICATIONS

Extended European Search Report for EP Appl. No. 17838597.7, dated Mar. 12, 2020.

* cited by examiner

METHOD AND APPARATUS FOR TRANSMITTING TRANSPORT BLOCK, AND METHOD AND APPARATUS FOR RECEIVING TRANSPORT BLOCK

CROSS REFERENCE TO RELATED APPLICATIONS

This is a National Stage Application, under 35 U.S.C. 371, of International Patent Application No. PCT/CN2017/095401, filed on Aug. 1, 2017, which claims priority to Chinese Patent Application No. 201610664728.3. filed on Aug. 12, 2016, contents of both of which are incorporated herein by reference in their entireties.

TECHNICAL FIELD

This application relates to, but is not limited to, the field of communications, and in particular, to a method and apparatus for transmitting a transport block, and a method and apparatus for receiving a transport block.

BACKGROUND

In a mobile communication system, due to time-varying characteristics of a wireless fading channel, there is a large amount of uncertainty in a communication process. In order to improve the system throughput, high-order modulation with higher transmission rate and error correction codes with less redundancy may be employed for communications, in this way, when a signal-to-noise ratio of the wireless fading channel is ideal, the system throughput may be greatly improved. However, when the channel is in deep fading, reliable and stable communications may not be guaranteed. In addition, in order to ensure the reliability of the communications, low-order modulation with lower transmission rate and error correction codes with large redundancy may be employed for communications, that is, when the wireless channel is in deep fading, reliable and stable communications may be guaranteed. However, when the signal-to-noise ratio of the channel is relatively high, since the transmission rate is relatively low, which limits the improvement of the system throughput, resources will be wasted. In the early development of the mobile communication technology, people may resist the time-varying characteristics of the wireless fading channel and may guarantee the communication quality of the system when the channel is in deep fading only by increasing a transmission power of a transmitter and using a modulation and coding method with low order and large redundancy, without considering how to improve the system throughput. With the advancement of the technical level, there has been a technique that may adaptively adjust its transmission power, modulating and coding scheme, and frame length of data according to a state of the channel to overcome the time-varying characteristics of the channel, thereby obtaining a better communication effect, which is called an adaptive coding and modulation technology belonging to a typical link adaptation technique.

In a long term evolution (LTE) system, in order to implement an adaptive coding and modulation technique, a control signaling including channel state information (CSI) is uplink transmitted. The CSI includes a channel quality indication (CQI), a pre-coding matrix indicator (PMI), and a rank indicator (RI). The CSI reflects a state of a downlink physical channel. A base station uses the CSI to perform downlink scheduling and perform data coding and modulation. The feedback of the CSI may be periodic or non-periodic.

The CQI is an indicator used to measure the quality of the downlink channel. In a 36-213 protocol, the CQI is represented by an integer value of 0 to 15, which respectively represent different levels of the CQI, and different CQIs correspond to respective modulation and coding schemes (MCS), as shown in Table 1. The level of the CQI selected by a user equipment (UE) should be such that a block error rate of a transport block (TB) of a physical downlink shared channel (PDSCH) corresponding to the CQI in the corresponding MCS is not greater than 0.1.

TABLE 1

| CQI index | Modulating scheme | Code rate × 1024 | Spectral efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In the above Table 1, QAM represents quadrature amplitude modulation, and QPSK represents quadrature phase shift keying, which is a digital modulation mode.

After experiencing several versions Rel-8/9/10/11 of the LTE system, a research on the R12 technique begins. In a Rel-11 standard, the uplink and a downlink support the modulating and coding scheme of up to 64QAM. Along with the development of a heterogeneous network, small cells require higher data transmission rate and higher system spectral efficiency, introducing a higher-order modulating and coding scheme of 256 QAM.

In the LTE, in addition to a differential CQI, the CQI is represented by 4 bits. The bits of the CQI are included in uplink control information (UCI) for being reported. The base station performs scheduling according to the CQI reported by the terminal, and determines a downlink MCS index and resource allocation information. Among them, a LTE protocol of the Rel-8 defines a modulation and TBS index table (hereinafter also referred to as a MCS Table or MCS table). As shown in Table 2, the table has 32 levels, basically each level corresponds to one MCS index, and each MCS index essentially corresponds to an MCS (or a spectral efficiency, the MCS is not limited to the MCS of Table 1). The resource allocation information indicates the number of physical resource blocks (NPRB) that downlink transmission needs to occupy. The LTE standard also provides a TBS table, according to the TBS table, a transport block size (TBS) may be obtained given the MCS index and the NPRB. With these coding and modulation parameters (including the MCS, a physical resource block (PRB), the TBS), the base station may perform coding and modulation on downlink data for downlink transmission.

TABLE 2

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26/26A |
| 29 | 2 | reserved |
| 30 | 4 | |
| 31 | 6 | |

After receiving data transmitted by the downlink, the terminal needs to acquire the MCS index and the TBS transmitted by the downlink for demodulating and decoding the data. The base station transmits downlink control information, including a 5-bit MCS index and a resource allocation location, by using a physical downlink control channel (PDCCH) in a specific downlink control information (DCI) format (DCI format). After acquiring the downlink control information, the terminal obtains the TBS according to the TBS table, and is used for demodulation and decoding. The DCI format includes more of a DCI format 0, a DCI format 1, a DCI format 1A, a DCI format 1B, a DCI format 1C, a DCI format 1D, a DCI format 2, a DCI format 2A, a DCI format 2B, a DCI format 2C, a DCI format 2D, a DCI format 3 and a DCI format 3A.

In addition, in the long term evolution (LTE) system, intra-cell interference is generally small due to the use of the orthogonal frequency division multiplexing (OFDM) technique. However, due to inter-cell frequency multiplexing, inter-cell interference is relatively large, resulting in relatively poor cell-edge performance. In order to improve the performance of cell-edge users and meet requirements of the cell-edge spectral efficiency, the coordinated multi-point (CoMP) transmission technique is introduced in a long term evolution-advanced (LTE-A) system. The CoMP technique is coordinated by multiple neighboring base stations or nodes, and provides services for one cell-edge user, so that a lower cell-edge user receives a co-channel interference of a neighboring cell, and the service quality of the cell-edge user is improved. Among them, the CoMP technique mainly includes three types: joint transmission (JT for short), dynamic point selection/dynamic point blanking (DPS/DPB for short), and coordinated scheduling coordinated beamforming (CSCB for short). For the JT, a serving cell and a coordinated cell jointly provide signal transmission to a target user on the same time-frequency resource. For the terminal, an interference signal becomes a useful signal at this time, so that the receiving quality of the signal may be greatly improved.

As shown in FIG. 1, the non-correlated JT technique has two base stations jointly serving the user. At this time, the serving cell and the coordinated cell respectively transmit a transport block/codeword stream (such as w0 and w1) to the user through an antenna array, and in this way, there are interferences between different transport blocks/codeword streams. In addition, it is possible for the serving cell and the coordinated cell to independently schedule different transport blocks/codeword streams, which may cause partial overlap of resource allocation among coordinated nodes, that is, there are interferences on some physical resource blocks, and there is no interference on some physical transport blocks, as shown in FIG. 2 and FIG. 3. However, the current standard specifies that the same modulating and coding scheme is used on all frequency-domain resources occupied by the same transport block, so that the above situation will lead to poor adaptability of a link, thereby influencing the overall performance of the system. In addition, for a case where the 5G New-RAT needs to support hybrid of multiple services, including enhanced mobile broadband (eMBB), ultra-reliable and low latency communications (URLLC), massive machine type communications (MMTC) and the like, there is a special interference situation in a multi-service hybrid scenario. As shown in FIG. 4, the same modulating and coding scheme used on all frequency-domain resources occupied by the same transport block specified in the current standard may not be applicable to the 5G New-RAT. In addition, for multi-user multiple input multiple output (MU-MIMO), there may be a case where different users and numbers are multiplexed on different frequency-domain resources. As shown in FIG. 5, the current standard does not support this situation.

SUMMARY

The following is an overview of the subject matter detailed in this application. This summary is not intended to limit the scope of the claims.

Embodiments of the present disclosure provide a method and apparatus for transmitting a transport block, a method and apparatus for receiving a transport block, to avoid interferences between physical resource blocks.

One aspect of the embodiment of the present disclosure provides a method for transmitting a transport block is provided, including: acquiring, by a transmitting node, a data signal obtained by performing a process of a physical layer procedure on the transport block, where the physical layer procedure at least includes channel coding and modulation, one transport block has multiple modulating and coding schemes, and the multiple modulating and coding schemes include multiple modulating schemes, or multiple coding schemes, or multiple modulating schemes and multiple coding schemes; and transmitting, by the transmitting node, the data signal and a control signal corresponding to the data signal to a receiving node.

Another aspect of the embodiment of the present disclosure provides a method for receiving a transport block, including: receiving, by a receiving node, a data signal and a control signal corresponding to the data signal transmitted from a transmitting node, where the data signal is a signal obtained by performing a process of a physical layer procedure on the transport block, the physical layer procedure at least includes channel coding and modulation, one transport block has multiple modulating and coding schemes, and the multiple modulating and coding schemes include multiple modulating schemes, or multiple coding schemes, or multiple modulating schemes and multiple coding schemes.

Another aspect of the embodiment of the present disclosure provides an apparatus for transmitting a transport block, which is applied to a transmitting node and includes: an acquisition unit configured to acquire a data signal obtained by performing a process of a physical layer procedure on the transport block, where the physical layer procedure at least includes channel coding and modulation, one transport block has multiple modulating and coding schemes, and the multiple modulating and coding schemes include multiple modulating schemes, or multiple coding schemes, or multiple modulating schemes and multiple coding schemes; and a transmission unit configured to transmit the data signal and a control signal corresponding to the data signal to a receiving node.

Another aspect of the embodiment of the present disclosure provides an apparatus for receiving a transport block, which is applied to a receiving node and includes: a reception unit configured to receive a data signal and a control signal corresponding to the data signal transmitted from a transmitting node. The data signal is a signal obtained by performing a process of physical layer procedure on the transport block. The physical layer procedure at least includes channel coding and modulation, one transport block has multiple modulating and coding schemes, and the multiple modulating and coding schemes include multiple modulating schemes, or multiple coding schemes, or multiple modulating schemes and multiple coding schemes.

Another aspect of the embodiment of the present disclosure provides a transmitting terminal, including a first memory storing program codes for performing the following steps: acquiring a data signal obtained by performing a process of a physical layer procedure on the transport block, where the physical layer procedure at least includes channel coding and modulation, the same transport block has multiple modulating and coding schemes, and the multiple modulating and coding schemes include multiple modulating schemes, or multiple coding schemes, or multiple modulating schemes and multiple coding schemes; and transmitting the data signal and a control signal corresponding to the data signal to a receiving node; a first processor configured to process the program codes stored in the first memory; and a first transmission apparatus, which is respectively connected with the first memory and the first processor and configured to transmit a signal corresponding to the program codes in the first memory.

Another aspect of the embodiment of the present disclosure provides a receiving terminal, including: a second memory storing program codes for performing the following steps: receiving, by a receiving node, a data signal and a control signal corresponding to the data signal transmitted from a transmitting node, where the data signal is a signal obtained by performing a process of a physical layer procedure on the transport block, the physical layer procedure at least includes channel coding and modulation, one transport block has multiple modulating and coding schemes, and the multiple modulating and coding schemes include multiple modulating schemes, or multiple coding schemes, or multiple modulating schemes and multiple coding schemes; a second processor configured to process the program codes stored in the second memory; and a second transmission apparatus, which is respectively connected with the second memory and the second processor and configured to transmit a signal corresponding to the program codes in the second memory.

According to another embodiment of the present disclosure, a storage medium is provided. The storage medium may be configured to store program codes for performing the following steps: acquiring a data signal obtained by performing a process of a physical layer procedure on the transport block, where the physical layer procedure at least includes channel coding and modulation, one transport block has multiple modulating and coding schemes, and the multiple modulating and coding schemes include multiple modulating schemes, or multiple coding schemes, or multiple modulating schemes and multiple coding schemes; and transmitting the data signal and a control signal corresponding to the data signal to a receiving node.

According to another embodiment of the present disclosure, a storage medium is provided. The storage medium may be configured to store program codes for performing the following step: receiving a data signal and a control signal corresponding to the data signal transmitted from a transmitting node, wherein the data signal is a signal obtained by performing a process of a physical layer procedure on the transport block, the physical layer procedure at least includes channel coding and modulation, one transport block has multiple modulating and coding schemes, and the multiple modulating and coding schemes include multiple modulating schemes, or multiple coding schemes, or multiple modulating schemes and multiple coding schemes.

In the embodiments of the present disclosure, the transmitting node acquires a data signal obtained by performing a process of a physical layer procedure on the transport block. The physical layer procedure at least includes channel coding and modulating. One transport block has multiple modulating and coding schemes, and the multiple modulating and coding schemes include multiple modulating schemes, or multiple coding schemes, or multiple modulating schemes and multiple coding schemes. Further, the transmitting node transmits the data signal and a control signal corresponding to the data signal to a receiving node. By adopting multiple coding and modulating schemes on the one transport block, the technical effects of avoiding interferences between physical resource blocks and improving the overall link adaptation capability are achieved.

Other aspects will be apparent upon reading and understanding accompanying drawings and detailed description.

DETAILED DESCRIPTION

This application will be described in detail below with reference to accompanying drawings in conjunction with embodiments.

It is to be noted that terms "first", "second", and the like in the specification and claims as well as the accompanying drawings of the present disclosure are used to distinguish similar objects, and are not necessarily used to describe a particular order or precedence order.

First Embodiment

Figure 6:
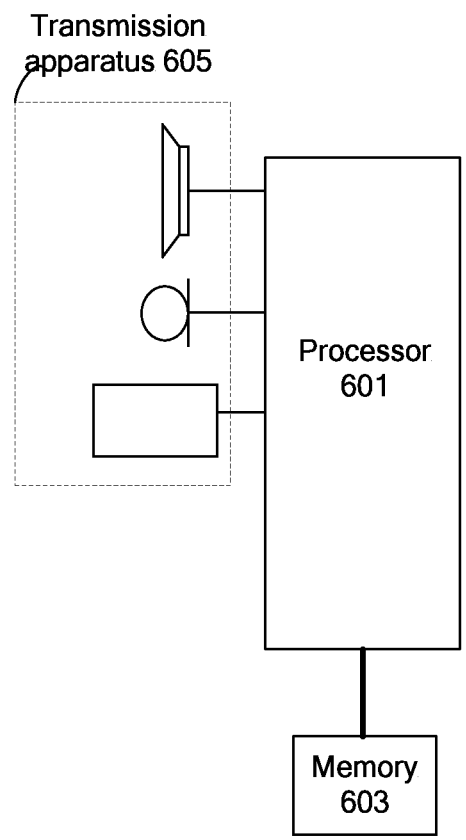
FIG. 6 is a schematic diagram of a computer terminal according to an embodiment of the present disclosure.

A method embodiment provided in the first embodiment of this application may be performed in a mobile terminal, a computer terminal or similar computing apparatuses. By taking a case where the method embodiment is performed on the computer terminal as an example, as shown in FIG. 6, the computer terminal may include one or more (only one shown) processors 601 (the processor 601 may include, but is not limited to, a microprocessor MCU or a programmable logic device FPGA and other processing apparatuses), a memory 603 for storing data, and a transmission apparatus 605 for achieving communication functions. It will be understood by those skilled in the art that a structure shown in FIG. 6 is merely illustrative and does not limit the structure of the above electronic apparatus.

The memory 603 may be configured as a software program and a module for storing application software, such as a program instruction/module corresponding to a control method of a device provided in the embodiment of the present disclosure. The processor 601 executes various functional applications and data processing, that is, implements the above-mentioned method, by running the software program and the module stored in the memory 603. The memory may include a high-speed random access memory and may further include a non-volatile memory, such as one or more magnetic storage apparatuses, a flash memory, or other non-volatile solid state memories. In some examples, the memory may further include a memory remotely located relative to the processor, these remote memories may be connected to the computer terminal over a network. Examples of such the network include, but are not limited to, the Internet, the intranet, a local area network, a mobile communication network, and a combination thereof.

The transmission apparatus is configured to receive or transmit data via a network. The example of the above-mentioned network may include a wireless network provided by a communication provider of the computer terminal. In one example, the transmission apparatus includes a network interface controller (NIC) that may be connected to other network devices through a base station, so as to communicate with the Internet. In one example, the transmission apparatus may be a radio frequency (RF) module used for communicating with the Internet wirelessly.

It should be noted that the foregoing processor may be a first processor or a second processor; the foregoing memory may be a first memory or a second memory; and the foregoing transmission apparatus may be a first transmission apparatus or a second transmission apparatus.

According to an embodiment of the present disclosure, a method embodiment of a method for transmitting a transport block is provided. It should be noted that steps shown in the flowcharts of the accompanying drawings may be performed in a computer system such as a set of computer executable instructions. Also, although logical sequences are shown in the flowcharts, in some cases the shown or described steps may be performed in a different order than the one described herein.

Figure 7:
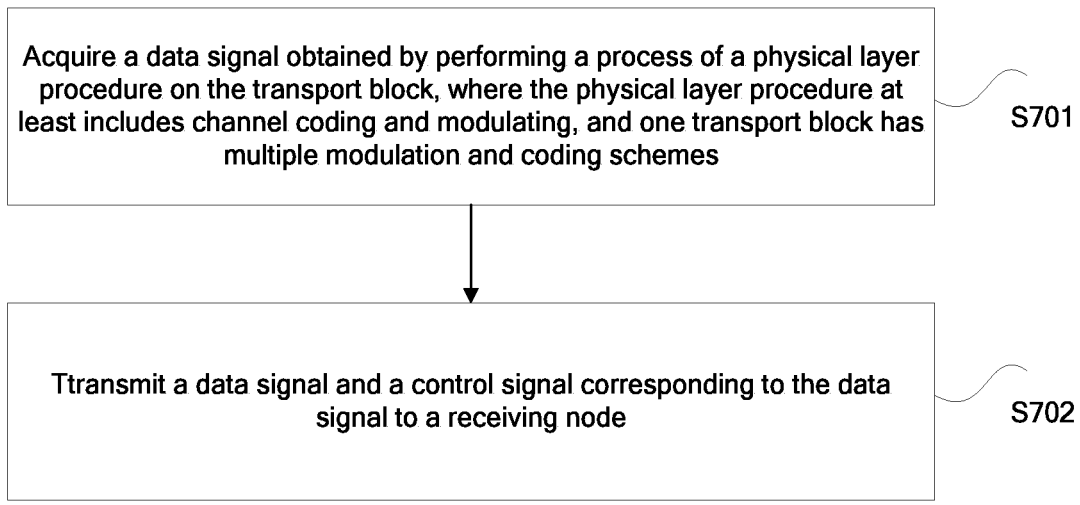
FIG. 7 is a flowchart of a method for transmitting a transport block according to an embodiment of the present disclosure.
Figure 8:
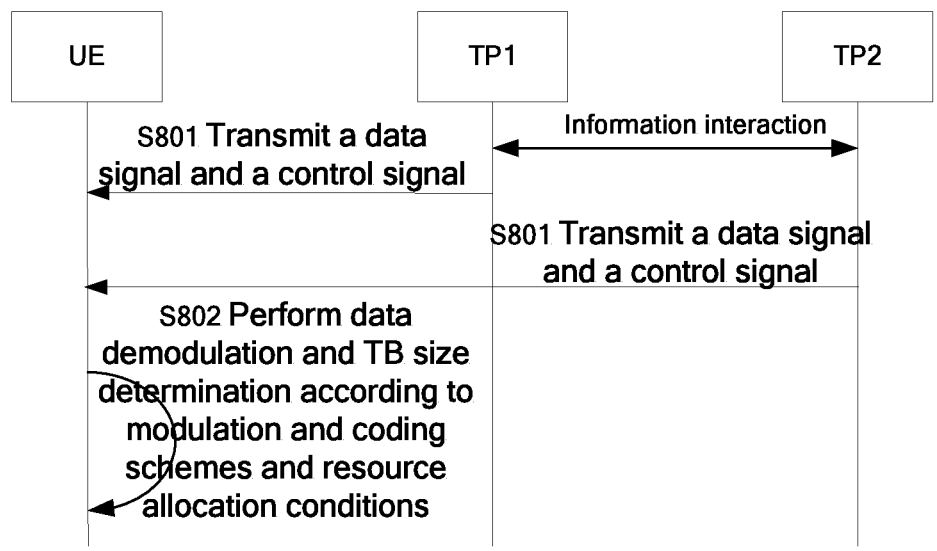
FIG. 8 is a flowchart of a method for transmitting a transport block according to an embodiment of the present disclosure.

FIG. 7 is a flowchart of a method for transmitting a transport block according to an embodiment of the present disclosure. As shown in FIG. 7, the method includes steps described below.

In step S701, a transmitting node acquires a data signal obtained by performing a process of a physical layer procedure on the transport block. The physical layer procedure at least includes channel coding and modulating. One transport block has multiple modulating and coding schemes, and the multiple modulating and coding schemes include multiple modulating schemes and/or multiple coding schemes.

In step S702, the transmitting node transmits the data signal and a control signal corresponding to the data signal to a receiving node.

According to the embodiment described above, acquiring, by the transmitting node, a data signal obtained by performing a process of a physical layer procedure on the transport block, where the physical layer procedure at least includes channel coding and modulating, one transport block has multiple modulating and coding schemes, and the multiple modulating and coding schemes include multiple modulating schemes and/or multiple coding schemes; and transmitting, by the transmitting node, the data signal and a control signal corresponding to the data signal to a receiving node. By adopting multiple coding and modulating schemes on one transport block, the technical effects of avoiding interferences between physical resource blocks and improving the overall link adaptation capability are achieved.

In the embodiment, in the case where the multiple modulating and coding schemes include multiple modulating schemes, in multiple modulation constellations of the multiple modulating schemes, the minimum distances between constellation points are different with respect to any two of the modulation constellations, where each of the multiple modulation constellations corresponds to one modulating scheme.

In one implementation, in multiple resources used by the data signal, at least two resources employ different modulating and coding schemes.

In one implementation, the resources include at least one of a frequency-domain resource, a time-domain resource, a transport layer, a codeword stream and a beam. The multiple resources are derived from a common transmitting node or multiple transmitting nodes, e.g., a combination of the frequency-domain resource and the transport layer.

In one implementation, the frequency-domain resource includes a physical resource block and/or a sub-band.

In one implementation, the resource includes one or more transport layers. In the case where there are multiple transport layers, the multiple transport layers are transport layers of the same codeword or transport layers of different codewords.

Figure 3:
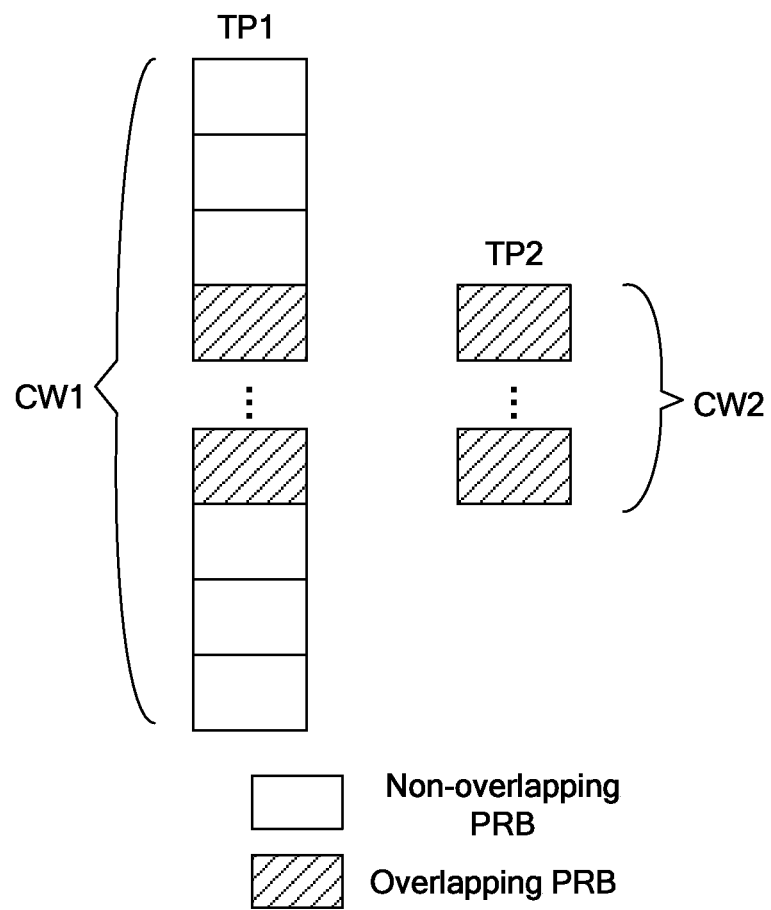
FIG. 3 is a schematic diagram of physical resource blocks in which interferences exist.
Figure 4:
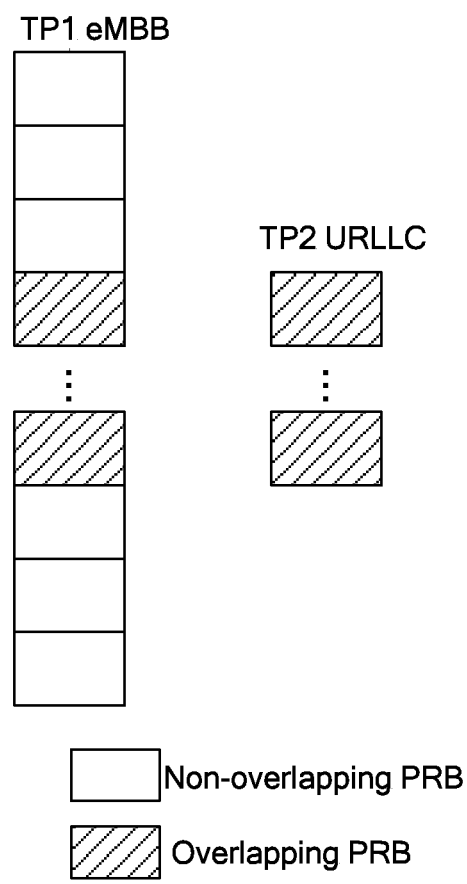
FIG. 4 is a schematic diagram of physical resource blocks in which interferences exist.

The number of transport layers of different resources may be different. As shown in FIG. 3, interferences received on different physical resource blocks in one transport block or codeword stream CW (such as CW1 and CW2) are different, i.e., overlapping portions and non-overlapping portions. Accordingly, different modulating and coding schemes are used with respect to the overlapping portions and the non-overlapping portions. For example, as shown in FIG. 4, interferences received on different physical resource blocks in one transport block or codeword stream CW are different, i.e., overlapping portions and non-overlapping portions. Accordingly, different modulating and coding schemes are used with respect to the overlapping portions and the non-overlapping portions.

In one implementation, a modulating and coding scheme of each of the resources may be determined by the following manner: the transmitting node determines a modulating and coding scheme adapted to the resource based on one or more of an interference condition, channel quality indication information, a load condition, and a service characteristic associated with the resource.

In one implementation, the control signal includes a DCI signaling.

In one implementation, the DCI signaling includes a modulating and coding scheme indication signaling, which is used to indicate a modulating and coding scheme of one or more of the transport blocks, and indicate multiple modulating and coding schemes used by each of the transport blocks. The numbers of modulating and coding schemes employed by different transport blocks are allowed to be different.

In one implementation, the modulating and coding scheme indication signaling is further used to indicate a modulating and coding scheme used by each of the multiple resources used by the data signal.

In one implementation, the DCI signaling includes a resource allocation message, which is used to indicate resource information about resources allocated to a plurality of modulating and coding schemes used by one transport block. The resource information at least includes the number of resources and locations of resources.

For example, it is necessary to indicate resources and locations of resources used by n types of different modulating and coding schemes in one transport block. For example, the first transport block has two modulating and coding schemes, QPSK and 64QAM, resource information using the QPSK and the 64QAM is indicated by the resource allocation message. For instance, a resource allocation mode 0 is employed, a bandwidth 10 MHz may be divided into 17 PRBGs (resource block groups), each of the PRBGs refers to a combination of some continuous PRBs, there are 3 PRBs in each PRBG in the bandwidth 10 MHz, and 17-bit bitmaps are required to indicate whether the PRBGs are allocated or not. The resources allocated to the QPSK and the 64QAM may be indicated by two 17-bit bitmaps, or because the resources occupied by the QPSK and the 64QAM do not overlap, joint coding may be performed as well, for example, the resource occupied by the QPSK includes 3 PRBGs, 9 PRBs in total, and the resource occupied by the 64QAM includes 6 PRBGs, 18 PRBs in total.

In one implementation, a transport block size may be determined in the following manner: determining the transport block size by the transmitting node based on multiple modulating and coding schemes used by one transport block and resource information indicated by the resource allocation message.

In one implementation, the multiple modulating schemes include at least one of QPSK, 16QAM, 64QAM, 256QAM, 8 phase shift keying (8PSK), 1024QAM, and hierarchical quadrature amplitude modulation (HQAM).

For example, the first transport block includes two modulating schemes, QPSK and 64QAM. In a DCI signaling, with respect to one transport block, there are two bitmaps for indicating two modulating and coding schemes, where $I_{TBS\_1}$ is configured as 00010, $I_{TBS\_2}$ is configured as 10011. With respect to other transport blocks, the modulating and coding schemes indicated may be different. For the second transport block, $I_{TBS\_1}$ may be configured as 01100 and $I_{TBS\_2}$ may be configured as 00001, indicating that the second transport block also has two modulating and coding schemes, and the modulating schemes used are 16QAM and QPSK.

For another example, the first transport block includes two modulating schemes, QPSK and 64QAM. In a DCI signaling, with respect to one transport block, there are two bitmaps for indicating two modulating and coding schemes respectively, where $I_{TBS\_1}$ is configured as 00010, $I_{TBS\_2}$ is configured as 10011. With respect to other transport blocks, the modulating and coding schemes indicated may be different. For the second transport block, There is only $I_{TBS\_1}$ which is configured as 01100, indicating that the second transport block has only one modulating and coding scheme, and the modulating scheme used is 16QAM.

In one implementation, the transmitting node determines the transport block size based on multiple modulating and coding schemes used by one transport block and resource information indicated by the resource allocation message in the following manner: the transmitting node determines the transport block size (TB) according to a formula $$TB = \sum_{i=1}^{n} (I_{TBS\_i}, m * N_{PRB\_i}),$$

wherein $I_{TBS\_i}$ represents an index of an i-th modulating and coding scheme, $N_{PRB\_i}$ represents the number of resources allocated by the i-th modulating and coding scheme, $1 \le m \le 4$, $1 \le i \le n$, and $n \ge 1$.

For example, by taking the first transport block as an example, as shown in Table 2, $I_{TBS\_1}$ is configured as 00010 (corresponding to a TBS Index of 2), and $I_{TBS\_2}$ is configured as 10011 (corresponding to a TBS Index of 17). It may be also known that the resource occupied by the QPSK includes 3 PRBGs, 9 PRBs in total, and the resource occupied by the 64QAM includes 6 PRBGs, 18 PRBs in total. It may be obtained by checking a TB size table that a TB size1 is 376 and a TB size2 is 6456, and then the TB size of the first transport block should be obtained based on the sum of the TB size1 and the TB size2 (i.e., 6832). In addition, it is necessary for this value to further match the numbers of rows and columns of a channel interleaver.

For another example, by taking the first transport block as an example, as shown in Table 2, $I_{TBS\_1}$ is configured as 00010 (corresponding to a TBS Index of 2), and $I_{TBS\_2}$ is configured as 10011 (corresponding to a TBS Index of 17). It may also be known that the resource occupied by the QPSK includes 3 PRBGs, 12 PRBs in total, and the resource occupied by the 64QAM includes 6 PRBGs, 18 PRBs in total. It may be obtained by checking a TB size table that a TB size1 is 520 and a TB size2 is 6456, and then the TB size of the first transport block should be obtained based on the sum of the TB size1 and the TB size2 (i.e., 6976). In addition, it is necessary for this value to further match the numbers of rows and columns of a channel interleaver.

In one implementation, the transmitting node allocates multiple modulating schemes and/or multiple coding schemes for a transport block which is used by a receiving node for transmitting an uplink data signal, and allocates resources used by the multiple modulating schemes and/or the multiple coding schemes.

In one implementation, the transmitting node includes at least one of an eNodeB, a Macro (macro base station), a Micro (micro base station), a Pico (pico base station), a femto (home base station), a RRH (radio remote head), and a relay; and the receiving node includes at least one of a terminal (UE) and a relay.

According to another aspect of the embodiment of the present disclosure, a method for receiving a transport block is further provided. The method includes: receiving, by a receiving node, a data signal and a control signal corresponding to the data signal transmitted from a transmitting node. The data signal is a signal obtained by performing a process of a physical layer procedure on the transport block, the physical layer procedure at least includes channel coding and modulating. One transport block has multiple modulating and coding schemes, and the multiple modulating and coding schemes include multiple modulating schemes and/or multiple coding schemes.

According to the method, by adopting multiple coding and modulating schemes on one transport block, the technical effects of avoiding interferences between physical resource blocks and improving the overall link adaptation capability are achieved.

In one implementation, the control signal includes a DCI signaling.

In one implementation, the DCI signaling includes a modulating and coding scheme indication signaling, which is used to indicate a modulating and coding scheme of one or more of the transport blocks, and indicate multiple modulating and coding schemes used by each of the transport blocks. The numbers of modulating and coding schemes employed by different transport blocks are allowed to be different.

For example, it is assumed that only one transport block includes two modulating schemes, QPSK and 64QAM. In the DCI signaling, with respect to the transport block, there are two bitmaps for indicating two modulating and coding schemes respectively, where $I_{TBS\_1}$ is configured as 00010, and $I_{TBS\_2}$ is configured as 10011.

For another example, the first transport block includes two modulating schemes, QPSK and 64QAM. In the DCI signaling, with respect to the transport block, there are two bitmaps for indicating two modulating and coding schemes respectively, where $I_{TBS\_1}$ is configured as 00010, $I_{TBS\_2}$ is configured as 10011. The modulating and coding scheme indication for other transport blocks may be different. For the second transport block, $I_{TBS\_1}$ may be configured as 01100 and $I_{TBS\_2}$ may be configured as 00001, indicating that the second transport block also has two modulating and coding schemes, and the modulating schemes used are 16QAM and QPSK.

In one implementation, the DCI signaling includes a resource allocation message, which is used to indicate resource information about resources allocated to multiple modulating and coding schemes used by one transport block. The resource information at least includes the number of resources and locations of resources.

For example, it is necessary to indicate resources and locations used by n different modulating and coding schemes of one transport block. For example, the first transport block has two modulating and coding schemes, QPSK and 64QAM. It is indicated by the resource allocation message that resource information of the QPSK and the 64QAM is used, for instance, a resource allocation mode 0 is employed, a bandwidth 10 MHz may be divided into 17 PRBGs (resource block groups), each of the PRBGs refers to a combination of some continuous PRBs, there are 3 PRBs in each PRBG in the bandwidth 10 MHz, and 17-bit bitmaps are required to indicate whether the PRBGs are allocated or not. The resources allocated to the QPSK and the 64QAM may be indicated by two 17-bit bitmaps, or because the resources occupied by the QPSK and the 64QAM do not overlap, joint coding may be performed as well, for example, the resource occupied by the QPSK includes 3 PRBGs, 9 PRBs in total, and the resource occupied by the 64QAM includes 6 PRBGs, 18 PRBs in total.

In one implementation, the resources include at least one of a frequency-domain resource, a time-domain resource, a transport layer, a codeword stream and a beam, where the multiple resources are derived from a common transmitting node or multiple transmitting nodes.

Numbers of transport layers of different resources may be different. For example, as shown in FIG. 4, there is the transmitting node to transmit URLLC services and occupy less resources, and then at this time, interferences received on different physical resource blocks in the same transport block or codeword (CW) are different, overlapping portions and non-overlapping portions, so that the overlapping portions and the non-overlapping portions use different modulating and coding schemes.

In one implementation, the frequency-domain resource includes a physical resource block and/or a sub-band.

In one implementation, the method further includes determining a transport block size in the following manner: the receiving node determines the transport block size based on multiple modulating and coding schemes used by one transport block and resource information indicated by the resource allocation message.

In one implementation, the receiving node determines the transport block size (TB) according to a formula $$TB = \sum_{i=1}^{n}(I_{TBS\_i}, m * N_{PRB\_i}),$$

where $I_{TBS\_i}$ represents an index of an i-th modulating and coding scheme, $N_{PRB\_i}$ represents the number of resources allocated by the i-th modulating and coding scheme, $1 \le m \le 4$, $1 \le i \le n$, and $n \ge 1$.

For example, by taking the first transport block as an example, as shown in Table 2, $I_{TBS\_1}$ is configured as 00010 (corresponding to a TBS Index of 2), $I_{TBS\_2}$ is configured as 10011 (corresponding to a TBS Index of 17), and the resource occupied by the QPSK includes 3 PRBGs, 9 PRBs in total, and the resource occupied by the 64QAM includes 6 PRBGs, 18 PRBs in total. It may obtained by checking a TB size table that a TB size1 is 376 and a TB size2 is 6456, then the TB size of the first transport block should be obtained based on the sum 6832 of the TB size1 and the TB size2. In addition, it is necessary for this value to further match the numbers of rows and columns of a channel interleaver.

In one implementation, multiple modulating and coding schemes include at least one of QPSK, 16QAM, 64QAM, 256QAM, 8PSK, 1024QAM and HQAM.

In one implementation, when receiving the DCI signaling from the transmitting node, the receiving node allocates multiple modulating schemes and multiple coding schemes for a transport block used for transmitting an uplink data signal according to an indication of the DCI signaling, and allocates resources used by multiple modulating schemes and resources used by multiple coding schemes.

The transmitting node, based on the DCI signaling, indicates that one transport block uses n modulating and coding schemes and resource allocation conditions for demodulating data, for example, the resource occupied by the QPSK uses the QPSK for demodulation, and the resource occupied by the 64QAM uses the 64QAM for demodulation.

In one implementation, the receiving node includes at least one of a terminal (UE) and a relay, and the transmitting node includes at least one of an eNodeB, a Macro, a Micro, a Pico, a femto, a RRH, and a relay.

In one implementation, the receiving node feeds at least one of the modulating schemes supported by the receiving node and the number of the modulating schemes back to the transmitting node via an uplink signaling, and/or feeds a suggested modulating scheme back to the transmitting node in the uplink control signaling. The uplink signaling includes a UCI signaling and/or a radio resource control (RRC) signaling. The transmitting node may also measure interferences on different frequency-domain resources and feed them back to the receiving node.

Embodiments of this application will be described in detail below with reference to FIG. 8 to FIG. 11.

Figure 1:
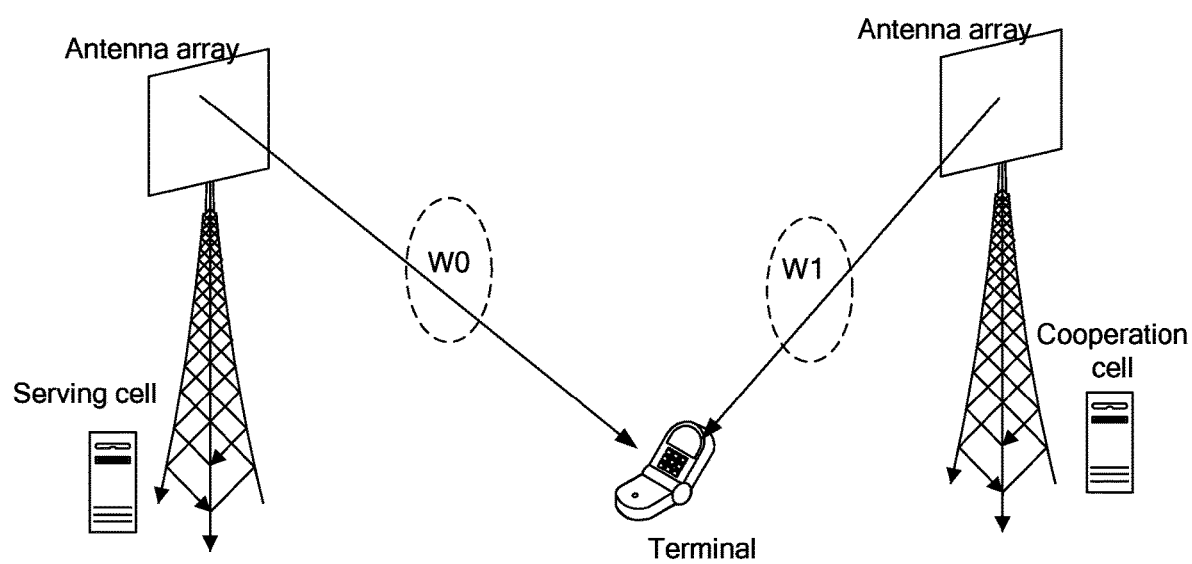
FIG. 1 is a schematic diagram of a base station system.
Figure 2:
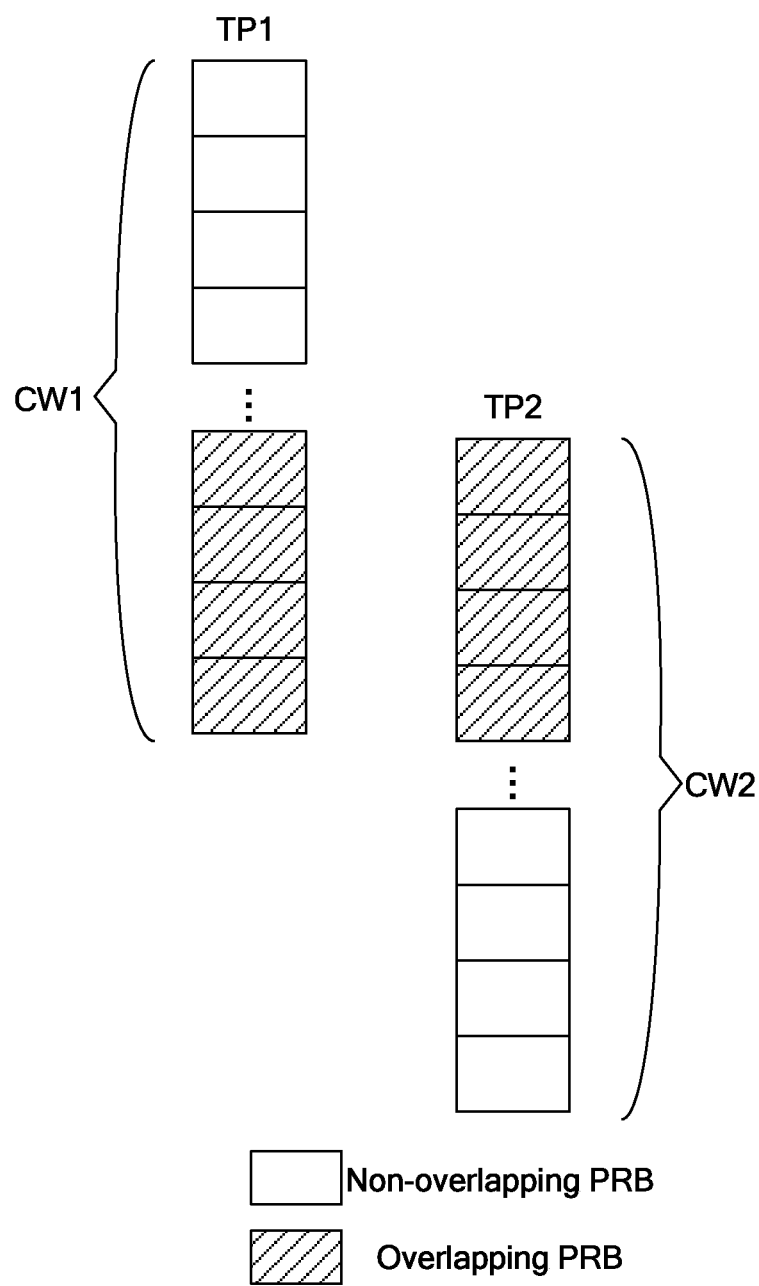
FIG. 2 is a schematic diagram of physical resource blocks in which interferences exist.

The numbers of transport layers of different resources may be different. As shown in FIG. 2, interferences received on different physical resource blocks in one transport block or codeword stream CW (such as CW1 and CW2) are different, overlapping portions and non-overlapping portions, so that the overlapping portions and the non-overlapping portions use different modulating and coding schemes. For this or a similar situation, method steps shown in FIG. 8 may be employed.

In S801, transmitting nodes (TP1 and TP2) transmit a data signal and a control signal to a receiving node (UE).

The above TP1 and TP2 jointly perform transmission, and each TP transmits a codeword stream, and corresponds to one transport block.

In one implementation, the TP1 and the TP2 may perform information interaction, such as jointly determine the control signal, and then the TP1 may transmit the data signal and the control signal, and the TP2 only transmits the data signal.

In S802, the receiving node acquires the data signal and the control signal transmitted from the transmitting node, and performs data demodulation and TB size determination according to n modulating and coding schemes used by one transport block and resource allocation conditions as indicated by the control signal.

For example, by taking the first transport block as an example, as shown in Table 2, $I_{TBS\_1}$ is configured as 00010 (corresponding to a TBS Index of 2), and $I_{TBS\_2}$ is configured as 10011 (corresponding to a TBS Index of 17). It may be known that the resource occupied by the QPSK includes 3 PRBGs, 9 PRBs in total, and the resource occupied by the 64QAM includes 6 PRBGs, 18 PRBs in total. It is obtained by checking a TB size table that a TB size1 is 376 and a TB size2 is 6456, and then the TB size of the first transport block should be obtained based on the sum 6832 of the TB size1 and the TB size2. In addition, it is necessary for this value to further match the numbers of rows and columns of a channel interleaver.

In addition, as shown in FIG. 3, interferences received on different physical resource blocks in the same transport block or codeword stream CW are different, overlapping portions and non-overlapping portions, so that the overlapping portions and the non-overlapping portions use different modulating and coding schemes. For the situation, a scheme shown in FIG. 8 may also be used.

Figure 9:
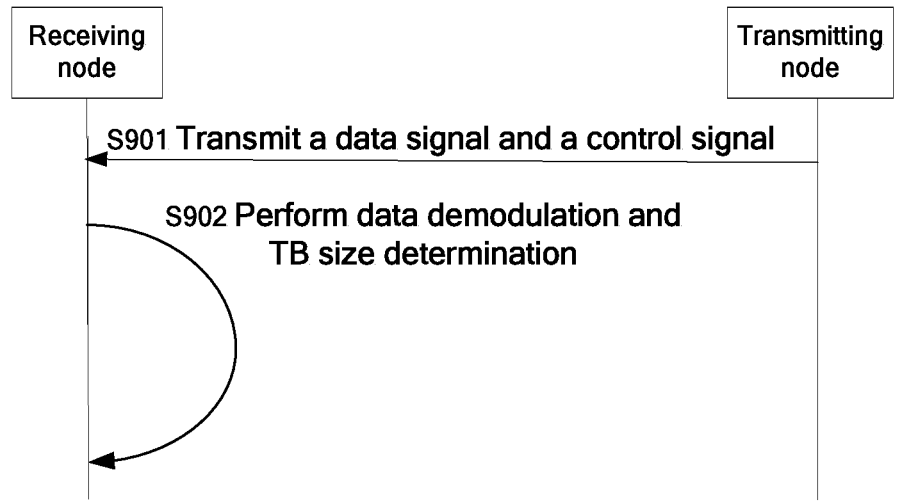
FIG. 9 is a flowchart of a method for transmitting a transport block according to an embodiment of the present disclosure.

As shown in FIG. 9, in S901, a transmitting node transmits a data signal and a control signal to a receiving node.

The first-class transmitting node transmits an eMBB service to the receiving node.

For example, as shown in FIG. 4, there is the transmitting node to transmit URLLC services and occupy less resources, then at this time, interferences received on different physical resource blocks in one transport block or codeword (CW) are different, overlapping portions and non-overlapping portions, so that the overlapping portions and the non-overlapping portions use different modulating and coding schemes.

In S902, the receiving node acquires the data signal and the control signal transmitted from the transmitting node, and performs data demodulation and TB size determination according to n modulating and coding schemes used by one transport block and resource allocation conditions as indicated by the control signal.

For another example, by taking the first transport block as an example, as shown in Table 2, $I_{TBS\_1}$ is configured as 00010 (corresponding to a TBS Index of 2), and $I_{TBS\_2}$ is configured as 10011 (corresponding to a TBS Index of 17). It may be known that the resource occupied by the QPSK includes 3 PRBGs, 12 PRBs in total, and the resource occupied by the 64QAM includes 6 PRBGs, 18 PRBs in total. It is obtained by checking a TB size table that a TB size1 is 520 and a TB size2 is 6456, and then the TB size of the first transport block should be obtained based on the sum 6976 of the TB size1 and the TB size2. In addition, it is necessary for this value to further match the numbers of rows and columns of a channel interleaver.

By using the above-mentioned implementation, the problem caused by using the same modulating and coding scheme on all frequency-domain resources occupied by one transport block in FIG. 4 may be solved, but it is not limited to this.

Figure 5:
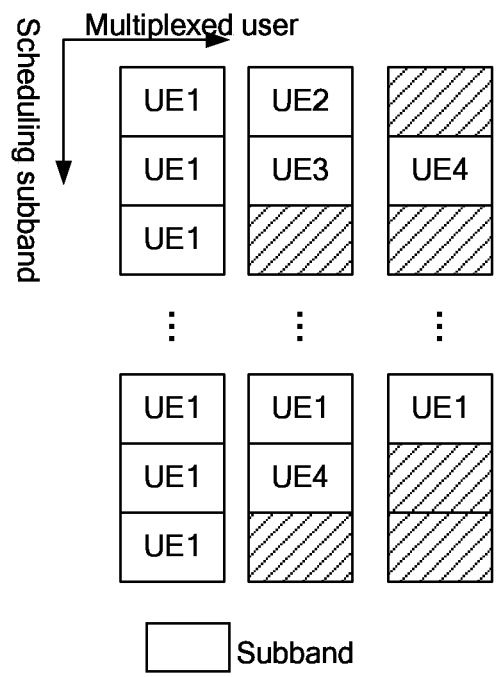
FIG. 5 is a schematic diagram of physical resource blocks in which interferences exist.

In addition, as shown in FIG. 5, users multiplexed on different sub-bands are different, and numbers of users multiplexed at the same time are different as well. Since the multiplexed users may not be completely orthogonal, there are interferences, indicating that interferences received on different sub-bands are different. In this case, it may be solved by the above method, but it is not limited to this.

Figure 10:
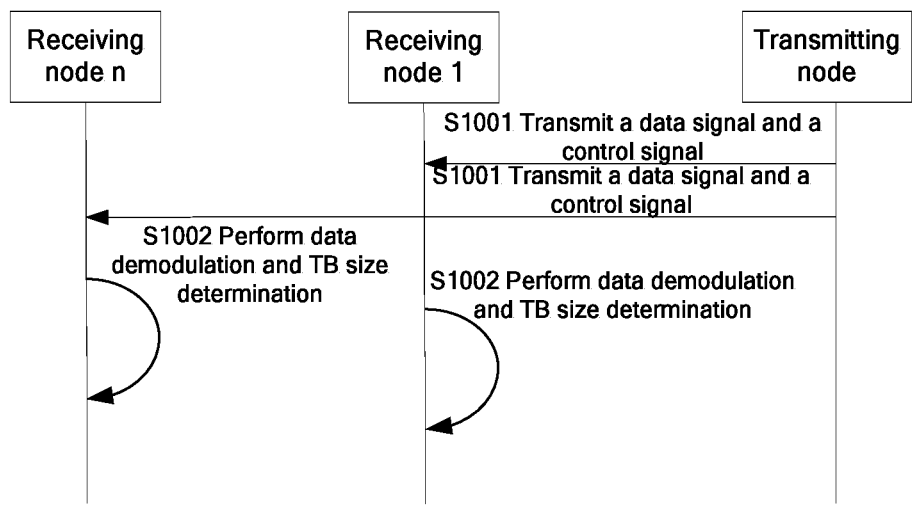
FIG. 10 is a flowchart of a method for transmitting a transport block according to an embodiment of the present disclosure.

As shown in FIG. 10, in S1001, a transmitting node transmits a data signal and a control signal to receiving nodes (receiving nodes 1 to receiving nodes n);

The transmitting node may use the MU-MIMO technique and transmit the data signal to multiple receiving nodes (i.e., user equipment (UE)).

In one implementation, different resources correspond to different interference conditions, channel quality indication information (CQI), load conditions, and service characteristics. For example, as shown in FIG. 5, users multiplexed on different sub-bands are different, and numbers of users simultaneously multiplexed are different. Since the multiplexed users may not be completely orthogonal, there are interferences, indicating that the interferences received on different sub-bands are different, then at this time, interferences received on different physical resource blocks in the one transport block or codeword stream CW are different, overlapping portions and non-overlapping portions, so that the overlapping portions and the non-overlapping portions use different modulating and coding schemes.

For example, as shown in FIG. 5, one transport block may include three to four modulation coding schemes.

In S1002, the receiving nodes acquire the data signal and the control signal transmitted from the transmitting node, and performs data demodulation and TB size determination (data block size determination) according to n modulating and coding schemes used by one transport block and resource allocation conditions as indicated by the control signal.

Figure 11:
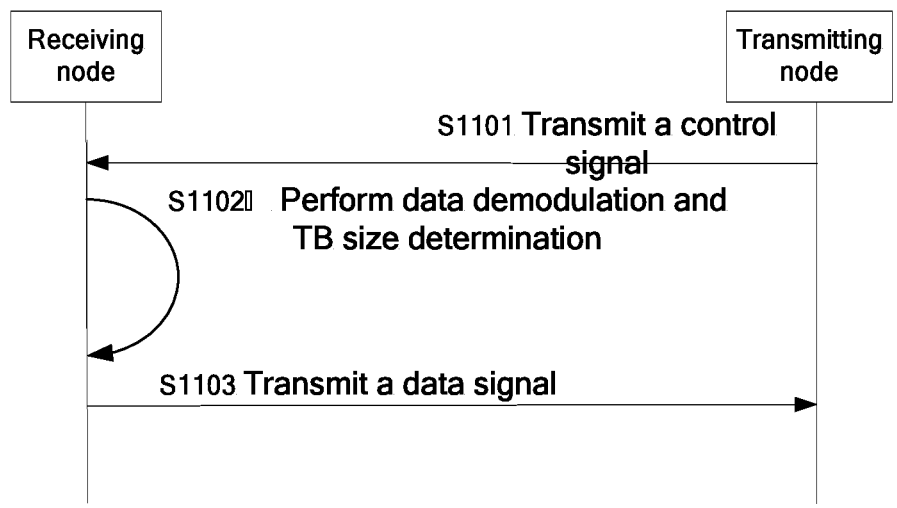
FIG. 11 is a flowchart of a method for transmitting a transport block according to an embodiment of the present disclosure.

As shown in FIG. 11, in S1101, a transmitting node transmits a control signal to a receiving node.

In one implementation, the control signal refers to a DCI signaling.

In one implementation, the transmitting node refers to at least one of a base station eNodeB, a Macro, a Micro, a Pico, a femto, a RRH, and a relay; and the transmitting node refers to at least one of a terminal (UE) and a relay.

In S1102, the receiving node acquires the control signal, and performs data modulation and TB size determination according to n modulating and coding schemes used by one transport block and resource allocation conditions as indicated by the control signal.

In one implementation, the receiving node receives the DCI signaling transmitted from the transmitting node, and configures k modulating and coding schemes used by one transport block and resources corresponding to the k modulating and coding schemes when the transmitting node transmits an uplink data signal, where k≥1; and the receiving node calculates a transport block size based on the k modulating and coding schemes used by one transport block and the resources corresponding to the k modulating and coding schemes, and transmits uplink data.

In one implementation, the DCI signaling includes a modulating and coding scheme indication signaling. The modulating and coding scheme indication signaling indicates a modulating and coding scheme used by the receiving node for transmitting uplink data, and further indicates k different modulating and coding schemes used by one transport block, where k≥1, and k values of different transport blocks may be different.

In one implementation, the DCI signaling further includes a resource allocation message, which indicates the number and locations of resources allocated to k different modulating and coding schemes used by one transport block when the receiving node transmits the uplink data, where k≥1.

In one implementation, the transport block size (TB size) is determined by n different modulating and coding schemes of one transport block, indicated by the modulating and coding scheme indication message, and resource information corresponding to k different modulating and coding schemes of the same transport block, indicated by the resource allocation message.

In one implementation, the transport block size may be obtained based on a formula $$\sum_{i=1}^{n}(I_{TBS\_i}, m*N_{PRB\_i}),$$

where 1≤m≤4, $I_{TBS\_i}$ represents an index of an i-th modulating and coding scheme, $N_{PRB\_i}$ represents a number of resources correspondingly allocated by the i-th modulating and coding scheme, 1≤i≤n and k≥1.

In one implementation, k different modulating and coding schemes refer to k different modulating schemes, or k different coding schemes, or k different modulating schemes and coding schemes, where k≥1.

In one implementation, k different modulating and coding schemes (MCS) are included in the one transport block, where k≥1.

In one implementation, k different modulating and coding schemes mean that different resources have different modulating and coding schemes when k>1.

In one implementation, the frequency-domain resource refers to a physical resource block (PRB) or sub-band.

In one implementation, the transport layers may be different transport layers of the same codeword and/or transport layers of different codewords.

In one implementation, different resources correspond to different interference conditions, channel quality indication information (CQI), load conditions, and service characteristics.

In one implementation, the modulating schemes include at least one of QPSK, 16QAM, 64QAM, 256QAM, or other modulating schemes.

For example, other modulating schemes refer to 8PSK, 1024QAM, and HQAM.

In S1103, the receiving node transmits the data signal.

In one implementation, the data signal refers to a signal formed by performing a physical layer process on the transport block.

In one implementation, the physical layer procedure at least includes channel coding and modulating.

By means of the description of the above embodiments, those skilled in the art may clearly understand that the method according to the above embodiment may be implemented by means of software plus a necessary general hardware platform, and certainly may be implemented by means of hardware, but in many cases, the former is a better implementation. Based on such an understanding, a portion of the technical solution of the present disclosure, which is essential or contributes to the prior art, may be embodied in the form of a software product stored in a storage medium (such as a ROM/RAM, a magnetic disk, an optical disk) and including a number of instructions for causing a terminal device (which may be a cell phone, a computer, a server, or a network device, and the like) to perform the methods described in various embodiments of the present disclosure.

Second Embodiment

An apparatus for transmitting a transport block is further provided in the embodiment of the present disclosure. The apparatus is used to implement the above embodiments and implementations, which have already been described and therefore will be omitted. As used below, the term "module" may implement a combination of software and/or hardware with a predetermined function. Although the apparatuses described in the following embodiments may be implemented in software, hardware or a combination of software and hardware is also possible and contemplated.

Figure 12:
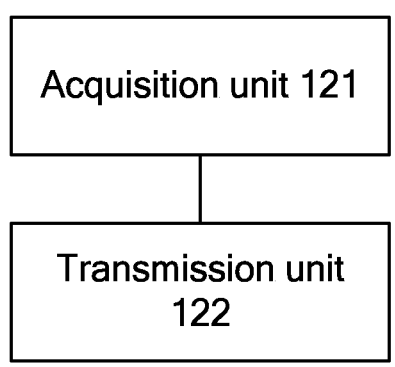
FIG. 12 is a schematic diagram of an apparatus for transmitting a transport block according to an embodiment of the present disclosure.

FIG. 12 is a schematic diagram of an apparatus for transmitting a transport block according to an embodiment of the present disclosure. As shown in FIG. 12, the apparatus may include an acquisition unit 121 and a transmission unit 122.

The acquisition unit 121 is configured to acquire a data signal obtained by performing a process of a physical layer procedure on the transport block. The physical layer procedure at least includes channel coding and modulating. One transport block has multiple modulating and coding schemes, and the multiple modulating and coding schemes include multiple modulating schemes and/or multiple coding schemes.

The transmission unit 122 is configured to transmit the data signal and a control signal corresponding to the data signal to a receiving node.

In the above embodiment, an acquisition unit acquires a data signal obtained by performing a process of a physical layer procedure on the transport block, where the physical layer procedure at least includes channel coding and modulating, one transport block has multiple modulating and coding schemes, and the multiple modulating and coding schemes include multiple modulating schemes and/or multiple coding schemes; and the transmission unit transmits the data signal and a control signal corresponding to the data signal to a receiving node. By adopting multiple coding and modulating schemes on one transport block, the technical effects of avoiding interferences between physical resource blocks and improving the overall link adaptation capability are achieved.

In the above embodiment, in the case where the multiple modulating and coding schemes include multiple modulating schemes, in multiple modulation constellations corresponding to the multiple modulating schemes, with respect to any two of the modulation constellations, the minimum distances between constellation points are different. Each of the multiple modulation constellations corresponds to one modulating scheme.

In one implementation, in multiple resources used by the data signal, modulating and coding schemes employed by at least two resources are different.

In one implementation, the resources include at least one of a frequency-domain resource, a time-domain resource, a transport layer, a codeword stream and a beam, wherein the multiple resources are derived from the same transmitting node or multiple transmitting nodes.

In one implementation, the frequency-domain resource includes a physical resource block and/or a sub-band.

In one implementation, the number of the transport layers is one or more, and in the case where there are multiple transport layers, the multiple transport layers are transport layers of the same codeword or transport layers of different codewords.

In one implementation, the apparatus further includes a first determination unit, which is configured to determine a modulating and coding scheme adapted to the resource based on one or more of an interference condition, channel quality indication information, a load condition, and a service characteristic associated with the resource.

In one implementation, the control signal includes a DCI signaling.

In one implementation, the DCI signaling includes a modulating and coding scheme indication signaling, which is used to indicate a modulating and coding scheme of one or more of the transport blocks, and indicate multiple modulating and coding schemes used by each of the transport blocks. The numbers of modulating and coding schemes employed by different transport blocks are allowed to be different.

In one implementation, the modulating and coding scheme indication signaling is further used to indicate a modulating and coding scheme used by each of the multiple resources used by the data signal.

In one implementation, the DCI signaling includes a resource allocation message, which is used to indicate resource information about resources allocated to a plurality of modulating and coding schemes used by one transport block. The resource information at least includes the number of resources and locations of resources.

In one implementation, the apparatus further includes a second determination unit, which is configured to determine a transport block size based on multiple modulating and coding schemes used by one transport block and resource information indicated by the resource allocation message.

In one implementation, multiple modulating schemes include at least one of QPSK, 16QAM, 64QAM, 256QAM, 8PSK, 1024QAM and HQAM.

In one implementation, the second determination unit is further configured to determine a transport block size (TB) according to a formula $$TB = \sum_{i=1}^{n} (I_{TBS\_i}, m * N_{PRB\_i}),$$

where $I_{TBS\_i}$ represents an index of an i-th modulating and coding scheme, $N_{PRB\_i}$ represents a number of resources allocated by the i-th modulating and coding scheme, $1 \leq m \leq 4$, $1 \leq i \leq n$, and $n \geq 1$.

In one implementation, the apparatus further includes a first allocation unit, which is configured to allocate multiple modulating schemes and/or multiple coding schemes for the transport block used by a receiving node for transmitting an uplink data signal, and allocate resources used by the multiple modulating schemes and/or the multiple coding schemes.

In one implementation, the transmitting node includes at least one of an eNodeB, a Macro, a Micro, a Pico, a femto, a RRH, and a relay; and the receiving node includes at least one of a terminal (UE) and a relay.

According to another embodiment of the present disclosure, a transmitting terminal (which corresponds to the above-mentioned transmitting apparatus) is provided, including: a first memory storing program codes for performing the following steps: a data signal obtained by performing a process of a physical layer procedure on the transport block is acquired, where the physical layer procedure at least includes channel coding and modulating, one transport block has multiple modulating and coding schemes, and the multiple modulating and coding schemes include multiple modulating schemes and/or multiple coding schemes; and the data signal and a control signal corresponding to the data signal are transmitted to a receiving node; a first processor configured to process the program codes stored in the first memory; and a first transmission apparatus, which is respectively connected with the first memory and the first processor and configured to transmit a signal corresponding to the program codes in the first memory.

According to yet another embodiment of the present disclosure, an apparatus for receiving a transport block is further provided, including: a reception unit configured to receive a data signal and a control signal corresponding to the data signal transmitted from a transmitting node, where the data signal is a signal obtained by performing a process of a physical layer procedure on the transport block, the physical layer procedure at least includes channel coding and modulating, one transport block has multiple modulating and coding schemes, and the multiple modulating and coding schemes include multiple modulating schemes and/or multiple coding schemes.

In one implementation, the control signal includes a DCI signaling.

In one implementation, the DCI signaling includes a modulating and coding scheme indication signaling, which is used to indicate a modulating and coding scheme of one or more of the transport blocks, and indicate multiple modulating and coding schemes used by each of the transport blocks. The numbers of modulating and coding schemes employed by different transport blocks are allowed to be different.

In one implementation, the DCI signaling includes a resource allocation message, which is used to indicate resource information about resources allocated to a plurality of modulating and coding schemes used by one transport block. The resource information at least includes the number of resources and locations of resources.

In one implementation, the resources include at least one of a frequency-domain resource, a time-domain resource, a transport layer, a codeword stream and a beam, wherein the multiple resources are derived from the same transmitting node or multiple transmitting nodes.

In one implementation, the frequency-domain resource includes a physical resource block and/or a sub-band.

In one implementation, the apparatus further includes a third determination unit, which is configured to determine a transport block size based on multiple modulating and coding schemes used by one transport block and resource information indicated by the resource allocation message.

In one implementation, the third determination unit is further configured to determine a transport block size (TB) according to a formula $$TB = \sum_{i=1}^{n} (I_{TBS\_i}, m * N_{PRB\_i}),$$

where $I_{TBS\_i}$ represents an index of an i-th modulating and coding scheme, $N_{PRB\_i}$ represents a number of resources allocated by the i-th modulating and coding scheme, $1 \leq m \leq 4$, $1 \leq i \leq n$, and $n \geq 1$.

In one implementation, multiple modulating schemes include at least one of QPSK, 16QAM, 64QAM, 256QAM, 8PSK, 1024QAM and HQAM.

In one implementation, the apparatus further includes a second allocation unit, which is configured to: when receiving a DCI signaling of the transmitting node, allocate multiple modulating schemes and multiple coding schemes for a transport block used for transmitting an uplink data signal according to an indication of the DCI signaling, and allocate resources used by multiple modulating schemes and resources used by multiple coding schemes.

In one implementation, the receiving node includes at least one of a terminal (UE) and a relay, and the transmitting node includes at least one of an eNodeB, a Macro, a Micro, a Pico, a femto, a RRH, and a relay.

In one implementation, the apparatus further includes a feedback unit, which is configured to perform at least of the following: feed at least one of modulating schemes supported by the receiving node and the number of the modulating schemes back to the transmitting node via an uplink signaling. The uplink signaling includes at least one of an uplink control information (UCI) signaling and a radio resource control (RRC) signaling; and/or feed the suggested modulating scheme to the transmitting node in the uplink control signaling.

According to further embodiment of the present disclosure, a receiving terminal (which corresponds to the above-mentioned receiving apparatus) is further provided, including: a second memory storing program codes for performing the following step: a receiving node receives a data signal and a control signal corresponding to the data signal transmitted from a transmitting node, where the data signal is a signal obtained by performing a process of a physical layer procedure on the transport block, the physical layer procedure at least includes channel coding and modulating, one transport block has multiple modulating and coding schemes, and the multiple modulating and coding schemes include multiple modulating schemes and/or multiple coding schemes; a second processor configured to process the program codes stored in the second memory; and a second transmission apparatus, which is respectively connected with the second memory and the second processor and configured to transmit a signal corresponding to the program code in the second memory.

It should be noted that the above modules may be implemented by software or hardware. For the latter, the foregoing may be implemented by the following manners including but not limited to: the foregoing modules are all located in the same processor; or the above modules are located in different processors in a form of any combination.

Third Embodiment

Embodiments of the present disclosure further provide a storage medium. In this embodiment, the above storage medium may be configured to store program codes for performing the following steps:

in S1, a data signal obtained by performing a process of a physical layer procedure on the transport block is acquired. The physical layer procedure at least includes channel coding and modulating, one transport block has multiple modulating and coding schemes, and the multiple modulating and coding schemes include multiple modulating schemes and/or multiple coding schemes.

In S2, the data signal and a control signal corresponding to the data signal are transmitted to a receiving node.

In this embodiment, the foregoing storage medium may include, but not limited to, a USB flash drive, a read-only memory (ROM), a random access memory (RAM), a mobile hard disk, a magnetic disk or an optical disk and other media that may store the program code.

In this embodiment, the processor performs the following steps according to the program code stored in the storage medium: a data signal obtained by performing a process of a physical layer procedure on the transport block is acquired, where the physical layer procedure at least includes channel coding and modulating, one transport block has multiple modulating and coding schemes, and the multiple modulating and coding schemes include multiple modulating schemes and/or multiple coding schemes; and the data signal and a control signal corresponding to the data signal are transmitted to a receiving node.

An example in this embodiment may refer to the examples described in the foregoing embodiments and the implementations, and this embodiment will be omitted herein.

Various modules or steps of the present disclosure described above may be implemented by a general-purpose computing apparatus, may be centralized on a single computing apparatus or distributed across a network composed of multiple computing apparatuses. They may be implemented by the program code executable by the computing apparatus, such that they may be stored in a storage apparatus and performed by the computing apparatus, and in some cases, the shown or described steps may be performed in an order different from the order herein, or they are separately fabricated as individual integrated circuit modules, or a plurality of modules or steps thereof are fabricated as a single integrated circuit module. In this way, the embodiment of the present disclosure is not limited to any specific combination of hardware and software.

The above description is only a preferred embodiment of the present disclosure, and is not intended to limit the present disclosure, and various modifications and changes may be made to the present disclosure. Any modifications, equivalent substitutions, improvements, and the like made within the spirit and scope of the present disclosure are intended to be included within the scope of the present disclosure.

INDUSTRIAL APPLICABILITY

In embodiments of the present disclosure, by adopting multiple coding and modulating schemes on ONE transport block, the technical effects of avoiding interferences between physical resource blocks and improving the overall link adaptation capability are achieved.

What is claimed is:

1. A method for transmitting a transport block, comprising:
   acquiring, by a transmitting node, a data signal obtained by performing a process of a physical layer procedure on the transport block, wherein the physical layer procedure at least comprises channel coding and modulating, one transport block has multiple modulating and coding schemes, and the multiple modulating and coding schemes comprise multiple modulating schemes, or multiple coding schemes, or multiple modulating schemes and multiple coding schemes; and
   transmitting, by the transmitting node, the data signal and a control signal corresponding to the data signal to a receiving node;
   wherein the control signal comprises a downlink control information (DCI) signaling, wherein the DCI signaling comprises a modulating and coding scheme indication signaling, wherein the modulating and coding scheme indication signaling is used to indicate the modulating and coding scheme of one or more transport blocks, and indicate multiple modulating and coding schemes used by each transport block, wherein total numbers of modulating and coding schemes employed by different transport blocks are allowed to be different the DCI signaling further comprises a resource allocation message, wherein the resource allocation message is used to indicate resource information about resources allocated to multiple modulating and coding schemes used by one transport block, wherein the resource information at least comprises a total number of the resources and locations of the resources;
   the method further comprises: determining a transport block size in the following manner; determining, by the transmitting node, the transport block size based on multiple modulating and coding schemes used by one transport block and the resource information indicated by the resource allocation message;
   wherein the determining, by the transmitting node, the transport block size based on multiple modulating and coding schemes used by one transport block and the resource information indicated by the resource allocation message comprises: determining, by the transmitting node, the transport block size (TB) according to a formula $$TB = \sum_{i=1}^{n}(I_{TBS\_i}, m * N_{PRB\_i}),$$

wherein $I_{TBS\_i}$ represents an index of an i-th modulating and coding scheme, $N_{PRB\_i}$ represents a total number of resources allocated by the i-th modulating and coding scheme, $1 \leq m \leq 4$, $1 \leq i \leq n$, and $n \geq 1$.

2. The method according to claim 1, wherein in the case where the multiple modulating and coding schemes comprise multiple modulating schemes, in multiple modulation constellations of the multiple modulating schemes, minimum distances between constellation points are different with respect to any two of the modulation constellations, wherein each of the multiple modulation constellations corresponds to one modulating scheme.

3. The method according to claim 1, wherein in multiple resources used by the data signal, at least two resources employ different modulating and coding schemes.

4. The method according to claim 3, wherein the resources comprise at least one of a frequency-domain resource, a time-domain resource, a transport layer, a codeword stream and a beam, wherein the multiple resources are derived from a common transmitting node or multiple transmitting nodes,
   wherein the frequency-domain resource comprises at least one of a physical resource block and a sub-band,
   wherein the resources comprise one or more transport layers, and in the case where there are multiple transport layers, the multiple transport layers are transport layers of the same codeword or transport layers of different codewords.

5. The method according to claim 4, further comprising: determining the modulating and coding scheme of each of the resources in the following manner:
   determining, by the transmitting node, a modulating and coding scheme adapted to the resource based on one or more of an interference condition, channel quality indication information, a load condition, and a service characteristic associated with the resource.

6. The method according to claim 1, wherein the modulating and coding scheme indication signaling is further used to indicate the modulating and coding scheme used by each of multiple resources used by the data signal.

7. The method according to claim 1, further comprising:
   allocating, by the transmitting node, multiple modulating schemes, multiple coding schemes, multiple modulating schemes and multiple coding schemes for the transport block used by transmitting, by a receiving node, an uplink data signal, and allocating resources used by the multiple modulating schemes, or the multiple coding schemes, or the multiple modulation methods and the multiple coding schemes.

8. A method for receiving a transport block, comprising:
   receiving, by a receiving node, a data signal and a control signal corresponding to the data signal transmitted from a transmitting node,
   wherein the data signal is obtained by performing a process of a physical layer procedure on the transport block, wherein the physical layer procedure at least comprises channel coding and modulating, one transport block has multiple modulating and coding schemes, and the multiple modulating and coding schemes comprise multiple modulating schemes, or multiple coding schemes, or multiple modulating schemes and multiple coding schemes;
wherein the control signal comprises a downlink control information (DCI) signaling, wherein the DCI signaling comprises a modulating and coding scheme indication signaling, wherein the modulating and coding scheme indication signaling is used to indicate the modulating and coding scheme of one or more transport blocks, and indicate multiple modulating and coding schemes used by each transport block, wherein total numbers of modulating and coding schemes employed by different transport blocks are allowed to be different the DCI signaling further comprises a resource allocation message, wherein the resource allocation message is used to indicate resource information about resources allocated to a plurality of modulating and coding schemes used by one transport block, wherein the resource information at least comprises a total number of resources and locations of the resources;
the method further comprises: determining a transport block size by the following manner; determining, by the receiving node, the transport block size based on multiple modulating and coding schemes used by one transport block and the resource information indicated by the resource allocation message,
wherein the determining, by the receiving node, the transport block size based on multiple modulating and coding schemes used by one transport block and resource information indicated by the resource allocation message comprises: determining, by the receiving node, the transport block size (TB) according to a formula $$TB = \sum_{i=1}^{n} (I_{TBS\_i}, m * N_{PRB\_i}),$$

wherein $I_{TBS\_i}$ represents an index of an i-th modulating and coding scheme, $N_{PRB\_i}$ represents a total number of resources allocated by the i-th modulating and coding scheme, 1≤m≤4, 1≤i≤n, and n≥1.

9. The method according to claim 8, wherein the resources comprise at least one of a frequency-domain resource, a time-domain resource, a transport layer, a codeword stream and a beam, wherein multiple resources are derived from a common transmitting node or multiple transmitting nodes, wherein the frequency-domain resource comprises at least one of a physical resource block and a sub-band.

10. An apparatus for receiving a transport block, applied to a receiving node, wherein the apparatus comprises a processor and a storage device for storing computer executable instructions that when executed by the processor cause the processor to perform the followings to implement the method for receiving a transport block according to claim 8:
receiving a data signal and a control signal corresponding to the data signal transmitted from a transmitting node, wherein the data signal is a signal obtained by performing a process of a physical layer procedure on the transport block, the physical layer procedure at least comprises channel coding and modulating, one transport block has multiple modulating and coding schemes, and the multiple modulating and coding schemes comprise multiple modulating schemes, or multiple coding schemes, or multiple modulating schemes and multiple coding schemes;
wherein the control signal comprises a downlink control information (DCI) signaling, wherein the DCI signaling comprises a modulating and coding scheme indication signaling, wherein the modulating and coding scheme indication signaling is used to indicate the modulating and coding scheme of one or more transport blocks, and indicate multiple modulating and coding schemes used by each transport block, wherein total numbers of modulating and coding schemes employed by different transport blocks are allowed to be different the DCI signaling further comprises a resource allocation message, wherein the resource allocation message is used to indicate resource information about resources allocated to a plurality of modulating and coding schemes used by one transport block, wherein the resource information at least comprises a total number of resources and locations of the resources;
determining a transport block size based on multiple modulating and coding schemes used by one transport block and the resource information indicated by the resource allocation message;
wherein the determining the transport block size based on multiple modulating and coding schemes used by one transport block and resource information indicated by the resource allocation message comprises: determining the transport block size (TB) according to a formula $$TB = \sum_{i=1}^{n} (I_{TBS\_i}, m * N_{PRB\_i}),$$

wherein $I_{TBS\_i}$ represents an index of an i-th modulating and coding scheme, $N_{PRB\_i}$ represents a total number of resources allocated by the i-th modulating and coding scheme, 1≤m≤4, 1≤i≤n, and n≥1.

11. The method according to claim 8, further comprising:
when receiving a downlink control information (DCI) signaling from the transmitting node, allocating, by the receiving node, multiple modulating schemes, or multiple coding schemes, or multiple modulating schemes and multiple coding schemes for the transport block used for transmitting an uplink data signal according to an indication of the DCI signaling; and allocating resources used by the multiple modulating schemes, resources used by the multiple coding schemes, resources used by the multiple modulating schemes and resources used by the multiple coding schemes; and transmitting the uplink data signal.

12. The method according to claim 8, further comprising at least one of:
feeding, by the receiving node, at least one of modulating schemes supported by the receiving node and a total number of the modulating schemes supported by the receiving node back to the transmitting node via an uplink signaling, wherein the uplink signaling comprises at least one of an uplink control information (UCI) signaling and a radio resource control (RRC) signaling; and
feeding, by the receiving node, a suggested modulating scheme to the transmitting node in the uplink control signaling.

13. An apparatus for transmitting a transport block, applied to a transmitting node, wherein the apparatus comprises a processor and a storage device for storing computer executable instructions that when executed by the processor cause the processor to perform the followings:

acquiring a data signal obtained by performing a process of a physical layer procedure on the transport block, wherein the physical layer procedure at least comprises channel coding and modulating, one transport block has multiple modulating and coding schemes, and the multiple modulating and coding schemes comprise multiple modulating schemes, or multiple coding schemes, or multiple modulating schemes and multiple coding schemes; and transmitting the data signal and a control signal corresponding to the data signal to a receiving node;

wherein the control signal comprises a downlink control information (DCI) signaling, wherein the DCI signaling comprises a modulating and coding scheme indication signaling, wherein the modulating and coding scheme indication signaling is used to indicate the modulating and coding scheme of one or more transport blocks, and indicate multiple modulating and coding schemes used by each transport block, wherein total numbers of modulating and coding schemes employed by different transport blocks are allowed to be different the DCI signaling further comprises a resource allocation message, wherein the resource allocation message is used to indicate resource information about resources allocated to multiple modulating and coding schemes used by one transport block, wherein the resource information at least comprises a total number of the resources and locations of the resources;

determining a transport block size based on multiple modulating and coding schemes used by one transport block and the resource information indicated by the resource allocation message;

wherein the determining the transport block size based on multiple modulating and coding schemes used by one transport block and the resource information indicated by the resource allocation message comprises: determining the transport block size (TB) according to a formula $$TB = \sum_{i=1}^{n} (I_{TBS\_i,m} * N_{PRB\_i}),$$

wherein $I_{TBS\_i}$ represents an index of an i-th modulating and coding scheme, $N_{PRB\_i}$ represents a total number of resources allocated by the i-th modulating and coding scheme, $1 \le m \le 4$, $1 \le i \le n$, and $n \ge 1$.

* * * * *